United States Patent
Chavez et al.

(10) Patent No.: US 9,674,231 B2
(45) Date of Patent: Jun. 6, 2017

(54) SEQUENCED TELEPHONY APPLICATIONS UPON CALL DISCONNECT METHOD AND APPARATUS

(75) Inventors: David L. Chavez, Broomfield, CO (US); Larry J. Hardouin, Broomfield, CO (US)

(73) Assignee: Avaya Inc., Basking Ridge, NJ (US)

(*) Notice: Subject to any disclaimer, the term of this patent is extended or adjusted under 35 U.S.C. 154(b) by 1254 days.

(21) Appl. No.: 12/722,262

(22) Filed: Mar. 11, 2010

(65) Prior Publication Data
US 2010/0246793 A1    Sep. 30, 2010

Related U.S. Application Data

(60) Provisional application No. 61/162,843, filed on Mar. 24, 2009.

(51) Int. Cl.
*H04M 3/22* (2006.01)
*H04L 29/06* (2006.01)
(Continued)

(52) U.S. Cl.
CPC ...... *H04L 65/1016* (2013.01); *H04L 65/1006* (2013.01); *H04L 65/1069* (2013.01);
(Continued)

(58) Field of Classification Search
USPC ............................... 379/88.12, 142.04, 88.11
See application file for complete search history.

(56) References Cited

U.S. PATENT DOCUMENTS 5,438,570 A    8/1995  Karras et al.
6,567,505 B1   5/2003  Omori et al.
(Continued)

FOREIGN PATENT DOCUMENTS

CA    2102714    2/1991
CN    1901513    1/2007
(Continued)

OTHER PUBLICATIONS

Examiner Voisey, Search Report for UK Patent Application No. GB1004885.8, dated Jul. 23, 2010, 4 pages.
(Continued)

*Primary Examiner* — Amal Zenati
(74) *Attorney, Agent, or Firm* — Sheridan Ross P.C.

(57) ABSTRACT

Mechanisms and methods for providing sequenced applications upon communications session termination are provided. More particularly, a variety of messages, transcriptions, recordings, information sharing, billing, verification, participant listing, reporting, date and time stamping, linkages to other applications, launching of software programs, initiation of one or more subsequent communications sessions via the same or other communications modalities, and the like are possible. Provision of sequenced applications is performed in accordance with selections made as part of the initial negotiation of the communications session, during the communications session, or prior to the communications session to drive the applications launched upon call disconnect. The selections can include the features or resources for which associated applications will be launched in response to variables associated with the communications session, such as the identity of at least one participant to a communication, and the recipients of the application output.

12 Claims, 4 Drawing Sheets

(51) Int. Cl.
*H04M 3/42* (2006.01)
*H04L 29/08* (2006.01)

(52) U.S. Cl.
CPC .......... *H04L 67/14* (2013.01); *H04M 3/2218* (2013.01); *H04M 3/42* (2013.01); *H04M 3/42221* (2013.01); *H04M 3/42314* (2013.01); *H04M 2201/60* (2013.01); *H04M 2203/2072* (2013.01)

(56) References Cited

U.S. PATENT DOCUMENTS

| | | | |
|---|---|---|---|
| 6,735,288 | B1 | 5/2004 | Geen et al. |
| 6,768,792 | B2 | 7/2004 | Brown et al. |
| 7,379,538 | B1 * | 5/2008 | Ali et al. .................. 379/88.12 |
| 7,395,057 | B2 | 7/2008 | Awasthi et al. |
| 7,415,104 | B2 | 8/2008 | Gray et al. |
| 7,469,293 | B1 | 12/2008 | Yoakum et al. |
| 7,623,643 | B2 | 11/2009 | Raghav et al. |
| 7,623,645 | B1 | 11/2009 | Scott et al. |
| 8,166,176 | B2 | 4/2012 | Kumar et al. |
| 8,537,981 | B1 * | 9/2013 | Cyriac .................. H04M 11/04 379/37 |
| 2002/0073203 | A1 | 6/2002 | Gilleland |
| 2002/0141404 | A1 | 10/2002 | Wengrovitz |
| 2003/0106018 | A1 | 6/2003 | Silverbrook et al. |
| 2003/0187641 | A1 | 10/2003 | Moore et al. |
| 2003/0187650 | A1 | 10/2003 | Moore et al. |
| 2003/0236892 | A1 | 12/2003 | Coulombe |
| 2004/0086102 | A1 | 5/2004 | McMurry et al. |
| 2005/0100145 | A1 | 5/2005 | Spencer et al. |
| 2005/0276395 | A1 | 12/2005 | Schultz et al. |
| 2006/0053042 | A1 | 3/2006 | Yoshimura et al. |
| 2006/0067308 | A1 | 3/2006 | Cho |
| 2006/0140363 | A1 | 6/2006 | Khakoo et al. |
| 2006/0143318 | A1 | 6/2006 | Prajapat et al. |
| 2006/0199570 | A1 | 9/2006 | Vendrow |
| 2006/0253593 | A1 | 11/2006 | Jachner |
| 2007/0047522 | A1 | 3/2007 | Jefferson et al. |
| 2007/0064709 | A1 | 3/2007 | Holmstrom et al. |
| 2007/0232284 | A1 | 10/2007 | Mason et al. |
| 2007/0294354 | A1 | 12/2007 | Sylvain |
| 2009/0094531 | A1 | 4/2009 | Danieli et al. |
| 2009/0279533 | A1 | 11/2009 | Strebel et al. |
| 2010/0174560 | A1 | 7/2010 | Quan |
| 2010/0241512 | A1 | 9/2010 | Tirpak et al. |
| 2010/0246570 | A1 | 9/2010 | Chavez et al. |
| 2011/0075830 | A1 | 3/2011 | Dreher et al. |

FOREIGN PATENT DOCUMENTS

| | | |
|---|---|---|
| CN | 1998182 | 7/2007 |
| CN | 101155227 | 4/2008 |
| CN | 101170595 | 4/2008 |
| CN | 101253492 | 8/2008 |
| EP | 0781025 | 6/1997 |
| EP | 0848533 | 6/1998 |
| EP | 1564976 | 8/2005 |
| EP | 1826985 | 8/2007 |
| GB | 2273419 | 6/1994 |
| GB | 2403621 | 1/2005 |
| GB | 2433375 | 6/2007 |
| GB | 2460630 | 12/2009 |
| JP | 2001-061021 | 3/2001 |
| JP | 2002-252708 | 9/2002 |
| JP | 2005-167940 | 6/2005 |
| JP | 2005-348349 | 12/2005 |
| JP | 2007-324925 | 12/2007 |
| WO | WO 97/45990 | 12/1997 |
| WO | WO 2004/107723 | 12/2004 |
| WO | WO 2005/081570 | 9/2005 |
| WO | WO 2006/065083 | 6/2006 |
| WO | WO 2006/069212 | 6/2006 |
| WO | WO 2006/094741 | 9/2006 |
| WO | WO 2007/025436 | 3/2007 |
| WO | WO 2008/095536 | 8/2008 |

OTHER PUBLICATIONS

Official Action for United Kingdom Patent Application No. GB1004885.8, dated Oct. 20, 2014 3 pages.
Notice of Allowance with English Translation for Japan Patent Application No. 2010-063553, mailed Jan. 22, 2014 2 pages.
Official Action with English translation for Germany Patent Application No. 102010012549.0, dated Oct. 29, 2012 14 pages.
Official Action with English Translation for China Patent Application No. 201010140793.9, mailed Jan. 21, 2014 17 pages.
Official Action with English Translation for China Patent Application No. 201010140793.9, dated Jul. 2, 2013 18 pages.
Official Action with English Translation for Japan Patent Application No. 2010-063553, mailed Jul. 22, 2013 10 pages.

* cited by examiner

SEQUENCED TELEPHONY APPLICATIONS UPON CALL DISCONNECT METHOD AND APPARATUS

CROSS-REFERENCE TO RELATED APPLICATIONS

This application claims the benefit of U.S. Provisional Patent Application Ser. No. 61/162,843, filed Mar. 24, 2009, the entire disclosure of which is hereby incorporated herein by reference.

FIELD

The present invention is generally directed to communications systems, and to the performance of actions at the conclusion of communications sessions.

BACKGROUND

Communications systems can be associated with a variety of actions. For example, at the conclusion of a communications session, information from the communications session may need to be provided to other parties, subsequent communications sessions may need to be triggered, the communications may need to be recorded, transcoded, changed to a textual description or the like, or a communications session may need to be continued via another communication modality. Although it is known in the art to trigger sequential applications in relation to a communications session, prior systems are of limited sophistication and utility. For example, although systems that, upon call disconnect, prompt a user to enter call billing data, act to restore a disconnected communications session, perform contact center statistic reporting functions, and linkages between mark-up languages for communications and the like are known, these are very simplistic and either relate to billing or other statistics for the facilities used for the communications session or continuation of a communications session. In addition, such prior systems are inflexible, and are not suited to triggering a variety of actions.

Therefore, previous sequential applications are limited to either documenting a prior communications session or continuing/restoring a prior communications session. Moreover, such previous systems are characterized by implementing policies that are applied to every call, and to the collection of supplemental information.

SUMMARY

Embodiments of the present invention are directed to solving these and other problems and disadvantages of the prior art. According to embodiments of the present invention, a sequenced application process is provided that operates to initiate one or more sequenced applications if one or more variables associated with a communications session are determined to be present. The variable or variables identified by the sequenced application process can be determined by sequenced application rules that are referenced or applied by the sequenced application process. If one or more variables associated with a sequenced application rule are identified, the sequenced application process identifies one or more services or sequenced applications associated with the variable or variables by the sequenced application rules that are to be executed. The identified one or more services or applications are then executed upon termination of the communications session.

In accordance with embodiments of the present invention, a communication system providing a communication manager, a sequenced application process, sequenced application rules, and one or more sequenced applications can be provided. Alternatively, the various modules and applications can be distributed across a plurality of devices. The communication manager can provide information regarding communications sessions to the sequenced application process. The sequenced application process operates to apply one or more services in response to detecting one or more communication session variables, as determined by the sequenced application rules. Execution of services or applications in response to detection or identification of the communication session variables is performed, as specified by the sequenced application rules, upon termination of the communications session.

Additional features and advantages of embodiments of the present invention will become more readily apparent from the following description, particularly when taken together with the accompanying drawings.

DETAILED DESCRIPTION

Figure 1:
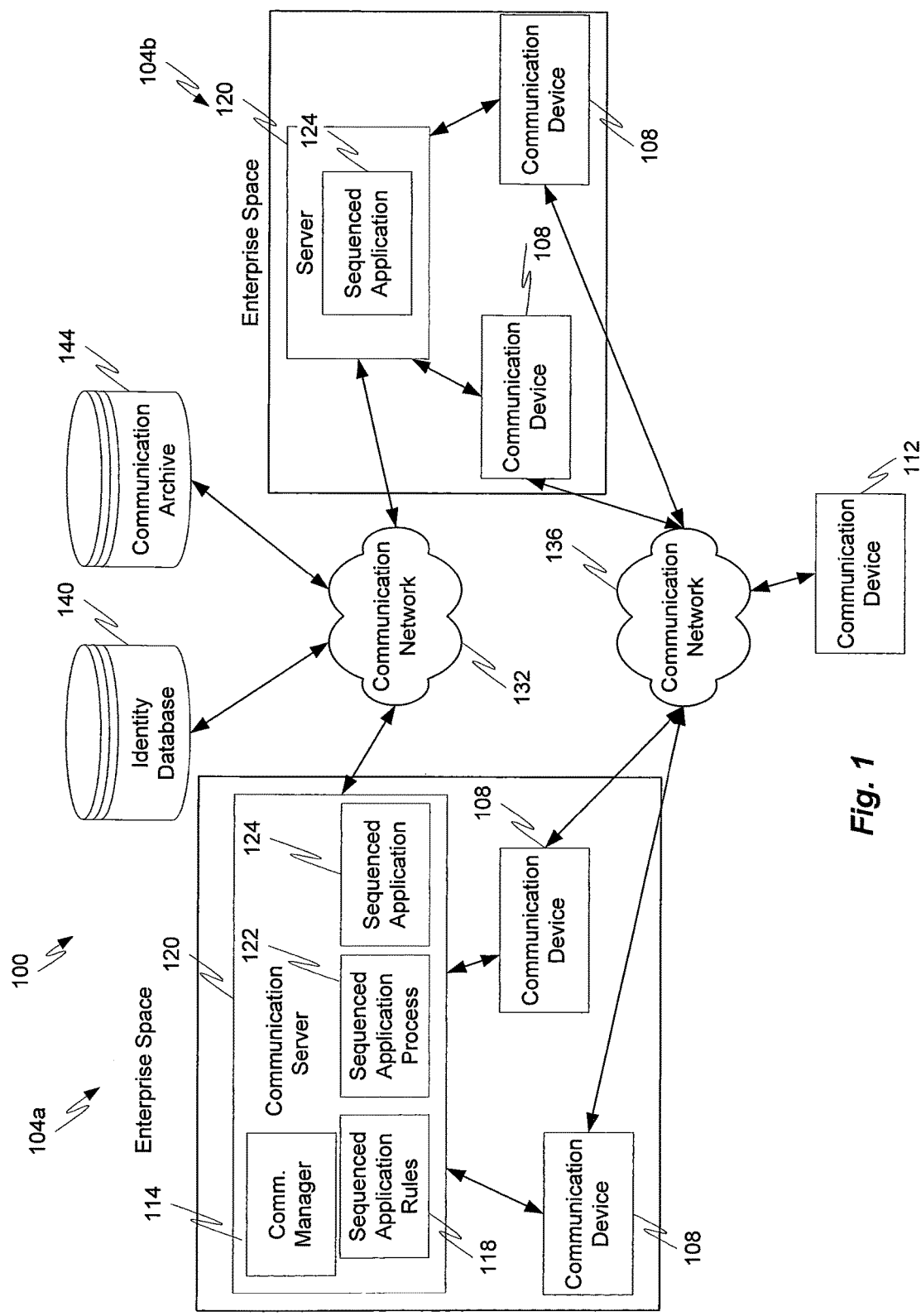
FIG. 1 is a block diagram depicting a communications system in accordance with at least some embodiments of the present invention.

With reference initially to FIG. 1, an exemplary communication system 100 will be described in accordance with at least some embodiments of the present invention. More specifically, the communication system 100 may comprise a plurality of communication devices in communication with one another using a number of possibly different communication modalities. In some embodiments, the communication system 100 includes two or more domains or enterprises 104a, 104b, which are owned and operated by two different entities (e.g., two different companies, enterprises, etc.).

One or both enterprises 104a, 104b may comprise one or more communication devices or endpoints 108 which allow users in the enterprise to communicate with other users either within the enterprise or with users outside of the enterprise. In particular, the communication devices 108 may be connected to a communication network 136 which facilitates communications with other non-enterprise communication devices or endpoints 112. Moreover, the communication network 136 may interconnect communication devices 108 in different enterprise domains. The boundaries of the enterprise space 104a, 104b may be defined by network boundary devices, such as Session Border Controllers (SBCs), gateways, or the like.

In some embodiments, the enterprise space 104a, 104b may include dedicated communications equipment or devices, thereby creating a local communication network for the enterprise space 104a, 104b. In particular, the enterprise space 104a, 104b may include a Local Area Network (LAN), a Wide Area Network (WAN), a Session Initiation Protocol (SIP) network, or the like. The initiation and control of communications sessions, and provision of features for such sessions, may be controlled or assisted by the operation of a communication manager 114 associated with a communication server or communication core 120. The communication manager 114 may comprise an IP PBX, such as the Avaya Aura Session Manager.

The communication network 136 may comprise any type and any number of communication mediums and devices which are capable of supporting communication sessions, such as voice calls, video calls, chats, emails, chats, TTY calls, multimedia sessions, or the like. The communication network 136 may include a LAN, a WAN, a SIP network, and any other type of packet-switched or circuit-switched network known in the art. In addition, it can be appreciated that communication network 136 need not be limited to any one network type, and instead may be comprised of a number of different networks and/or network types. The communication network 136 may include an IP Multi-media Subsystem (IMS) network, an architectural SIP standard well known in the art, or any other type of network which provides access to one or more of the Internet, a standard Plain Old Telephone System (POTS), an Integrated Services Digital Network (ISDN), the Public Switched Telephone Network (PSTN), and any type of known cellular communication network. Accordingly, the communication network 136 is equipped to facilitate communications between communication devices 108 and/or 112 via one or more communication media and/or modalities.

Sequenced application rules 118 are provided to control or determine the applications or services that are applied upon termination of a communications session. In particular, the sequenced application rules 118 specify the variable or variables associated with a communication session that are required to be present in order to trigger execution or application of particular sequenced applications 124. The sequenced application rules 118 can be stored on the communication server 120 itself. Alternatively or in addition, the sequenced application rules 118 can be stored on associated servers or devices.

In accordance with embodiments of the present invention, a sequenced application process 122 may be provided to select and control the running of services or applications associated with a communications session between communication devices or endpoints 108, 112. The sequenced application process 122 may be provided on a server 120 maintained within the enterprise space 104a and/or 104b. As a further example, the sequenced application process 122 may run or be implemented as part of the communication manager 114. In some embodiments, the sequenced application process 122 may be provided on a server external to a particular enterprise 104a, 104b associated with communications for which the sequenced application process 122 initiates applications. In such an embodiment, the sequenced application process 122 may be provided as software as a service (SaaS), as a cloud computing type application, or any other software application made available to users. The sequenced application process 122 may be administered by a user of a communication device 108 and/or 112, a system administrator, or another third party. In general, as will be apparent to one skilled in the art after consideration of the present disclosure, the sequenced application process 122 operates to compare information received regarding a communications session between communication devices 108 and/or 112 to the sequenced application rules 118 to determine the processes or applications to initiate at the termination of the communications session, and to determine when termination of the communications session has occurred.

In accordance with at least some embodiments of the present invention, and in response to or association with communications between the communication devices 108, 112, a service or sequenced application 124 may be provided and made available to one or more of the communication devices 108, 112. In some embodiments, the sequenced application 124 may be provided on a server 120 maintained within the enterprise space 104a and/or 104b. In other embodiments, a sequenced application 124 may be provided on a server external to any particular enterprise 104a, 104b utilizing its services. In such an embodiment, a sequenced application 124 may be provided as Software as a Service (SaaS), as an application which leverages cloud computing, or any other software application made available to users on either a subscription basis or paid for according to use. Thus, a sequenced application 124 may be administered by a single enterprise for use by the enterprise communication devices 108 or may be administered by a service provider for use by multiple non-enterprise communication devices 112.

In some embodiments, a sequenced application 124 may be provided within a communications server, such as a Microsoft® Exchange Server, as a thick client or routine for use by the server. In some embodiments, a sequenced application 124 may be made available for use via a web interface or the like. The format in which the sequenced application 124 is provided may vary depending upon system constraints and customer needs without departing from the scope of the present invention.

A sequenced application 124 may perform any of a variety of functions or services. Accordingly, a sequenced application 124 may access various repositories of data as necessary in completing the functions that it is to perform. For example, a sequenced application 124 may be capable of searching and retrieving relevant information from the identity database 140 and/or communication archive 144 via a communication network 132 or 136. A communication network 132 used by a sequenced application 124 may be separate and distinct from the communication network 136.

The identity database 140 may comprise information which allows a user's identity to be mapped to other identities or aliases used by that user. As an example, a user may have a first identity for a first communication modality (e.g., username@enterprise.com for email) and a second identity for a second communication modality (e.g., +13034441234 for voice calls). In accordance with at least some embodiments of the present invention, the multiple identities of a single user may be mapped together within the identity database 140.

In some embodiments the identity database 140 may be maintained within the enterprise space 104a, 104b and in other embodiments the identity database 140 may be maintained outside the enterprise space 104a, 104b by some service provider (e.g., email service provider, voice communications service provider, IM service provider, social network service provider, etc.) which provides communication services to a user. Although only a single identity database 140 is depicted, one skilled in the art will appreciate that multiple identity databases 140 may be accessed and searched by the sequenced application 124 when searching for contextual information.

In some embodiments, the communication archive 144 serves as a source of information by providing communication histories and related data. In some embodiments, the communication archive 144 maintains communication histories and possibly the communications themselves in an archived format. The communication archive 144 may be adapted to archive communications in different media and/or modalities. Thus, the communication archive 144 may be media and/or modality agnostic. In some embodiments, however, the communication archive 144 may be capable of archiving only certain types of communications (e.g., one of emails, text messages, voicemails, call history transcripts, call logs, blogs, social network message boards, etc.). In this configuration, multiple communication archives 144 may be provided for each of the different communication media and modalities that a certain user is capable of using. In accordance with at least some embodiments of the present invention, the communication archives 144 may be identified within the identity database 140, thereby allowing the sequenced application 124 to reduce the number communication archives 144 which are searched for information for a particular user or communication.

Similar to the identity database 140, the communication archive 144 may be maintained within the enterprise space 104a, 104b or external to the enterprise space 104a, 104b. Additionally, the communication archive 144 may be maintained within the server 120 that includes the sequenced application 124, especially if the sequenced application 124 is provided in a communications server such as a Microsoft® Exchange Server. Thus, the communications archive 144 may be local to the sequenced application 124. Alternatively, or in addition, communication archives 144 may be retrieved from communication devices 108, 112 if such devices are capable of maintaining a communications log (e.g., missed call log, outgoing call log, incoming call log, email log, SMS message log, IM log, etc.). This provides the sequenced application 124 multiple locations in which contextual information can be retrieved.

Also similar to the identity database 140, a sequenced application 124 may retrieve desired information from the communication archive 144 on an as-needed basis. Alternatively, or in addition, a sequenced application 124 may submit a persistent request to the communication archive 144 that causes the identity communication archive 144 to push information to a sequenced application 124 when any information is changed for a particular user or group of users.

In accordance with further embodiments of the present invention, a sequenced application 124 may provide or comprise a variety of sequenced applications. Moreover, a plurality of sequenced applications may be executed upon the termination of a communications session between communication devices or endpoints 108, 112. The system thus provided in association with the sequenced application 124 can apply to any variety or modality of a communications session, including but not limited to voice, instant messaging (IM), facsimile, chat, video, multimedia, web conference, blog, or the like. The particular services or applications 124 that are launched at the termination of a communications session can be administered by one of the parties to the communication, by an administrative person on behalf of the participants or third parties, by other classes of third parties, such as by a government agency, or the like. The set up of the services or applications 124 can be performed as part of the initial negotiation of the communications session, during the communications session, or prior to the communications session to drive the application or applications 124 that will be launched upon termination of the communications session.

Figure 2:
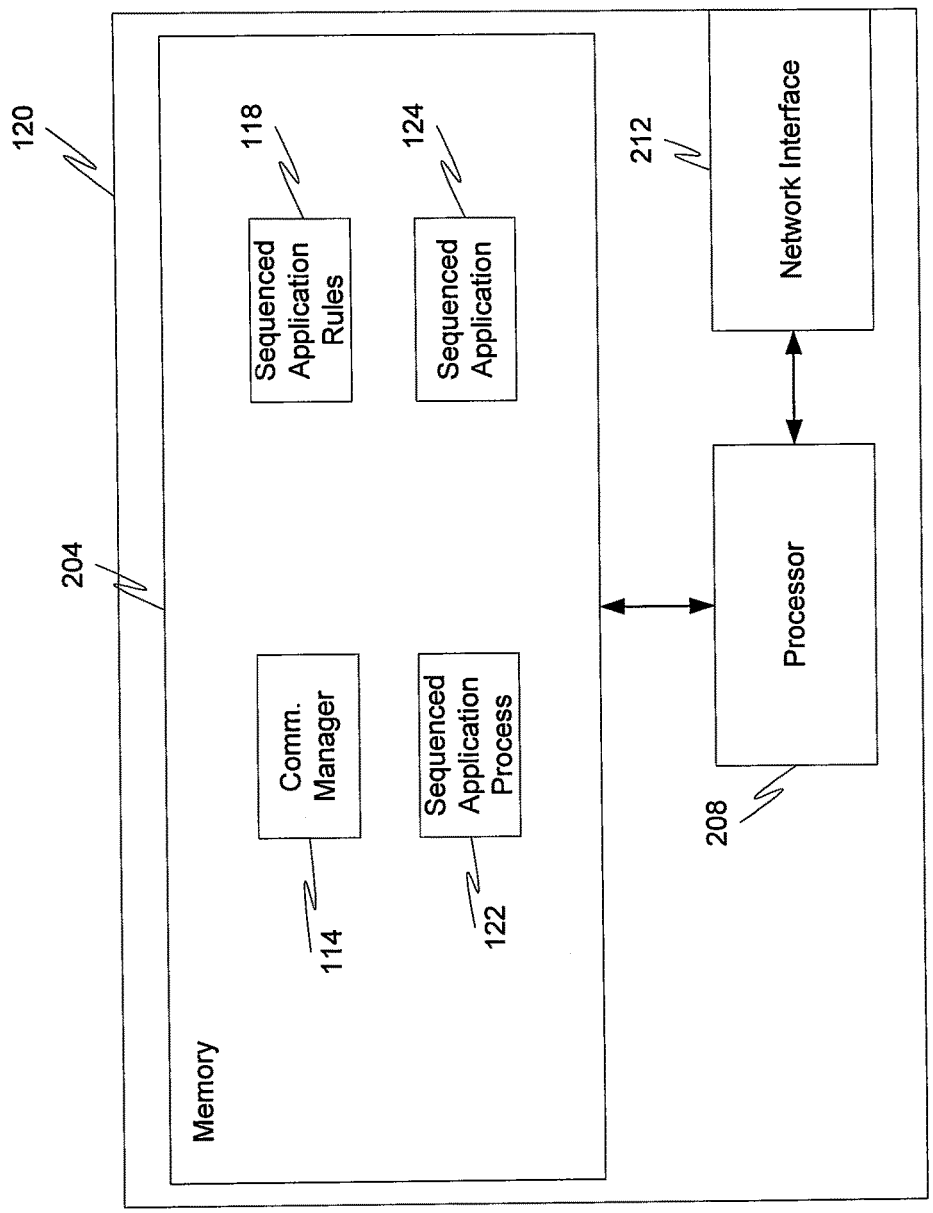
FIG. 2 is a block diagram depicting a server in accordance with at least some embodiments of the present invention.

With reference now to FIG. 2, additional details of a communication server 120 with a sequenced application process 122 providing one or more sequenced applications 124 will be described in accordance with at least some embodiments of the present invention. The sequenced application process 122 may be provided as instructions in memory 204 that are executable by a processor 208 co-located with the memory 204. Moreover, execution of the sequenced application process 122 may include referencing sequenced application rules 118 that are also held in memory 204. Results of the execution of the sequenced application process 122 can be used to direct the sequenced application or applications 124 that will be applied in association with a communication session between communication devices 108 and/or 112, at the termination of the communications session. The sequenced application or applications 124 may also be provided as instructions in memory 204 that are executable by a processor 208 co-located with the memory 204. Results of the execution of the sequenced application 124 may be shared with communication devices 108 and/or 112 via the network interface 212. As shown, the sequenced application 124 may be provided as part of the server 120 that functions as a communication manager or core that also provides or runs the sequenced application process 122. Alternatively or in addition, the sequenced application process 122 and/or the sequenced application 124 may be provided in connection with another server device.

The processor 208 may include any general-purpose programmable processor, digital signal processor (DSP) or controller for executing application programming. Alternatively, the processor 208 may comprise a specially configured Application Specific Integrated Circuit (ASIC).

The network interface 212 may comprise a communication modem, a communication port, or any other type of device adapted to condition packets for transmission across the communication network 132, 136 to a destination communication device as well as condition received packets for processing by the processor 208. Examples of network interfaces 212 include, without limitation, a network interface card, a modem, a wired telephony port, a serial or parallel data port, radio frequency broadcast transceiver, a USB port, or other wired or wireless communication network interfaces.

The memory 204 may be provided for use in connection with the execution of programming by the processor 208, and for the temporary or long term storage of program instructions and/or data, such as the sequenced application 124. Alternatively or in addition, data storage may be provided separate from the memory 204. The memory 208 may comprise a solid state memory device. The memory 208 may further comprise a hard disk drive or other random access memory. In accordance with still other embodiments, the memory 208 may provide random access storage and/or read-only storage.

In accordance with at least some embodiments of the present invention, the various processes and applications can include or be associated with modules operable to perform specific functions. For example, the sequenced applications process 122 may include a session manager module, a discovery module, an outbound processing module, a relevancy module, and a presentation module.

Figure 3:
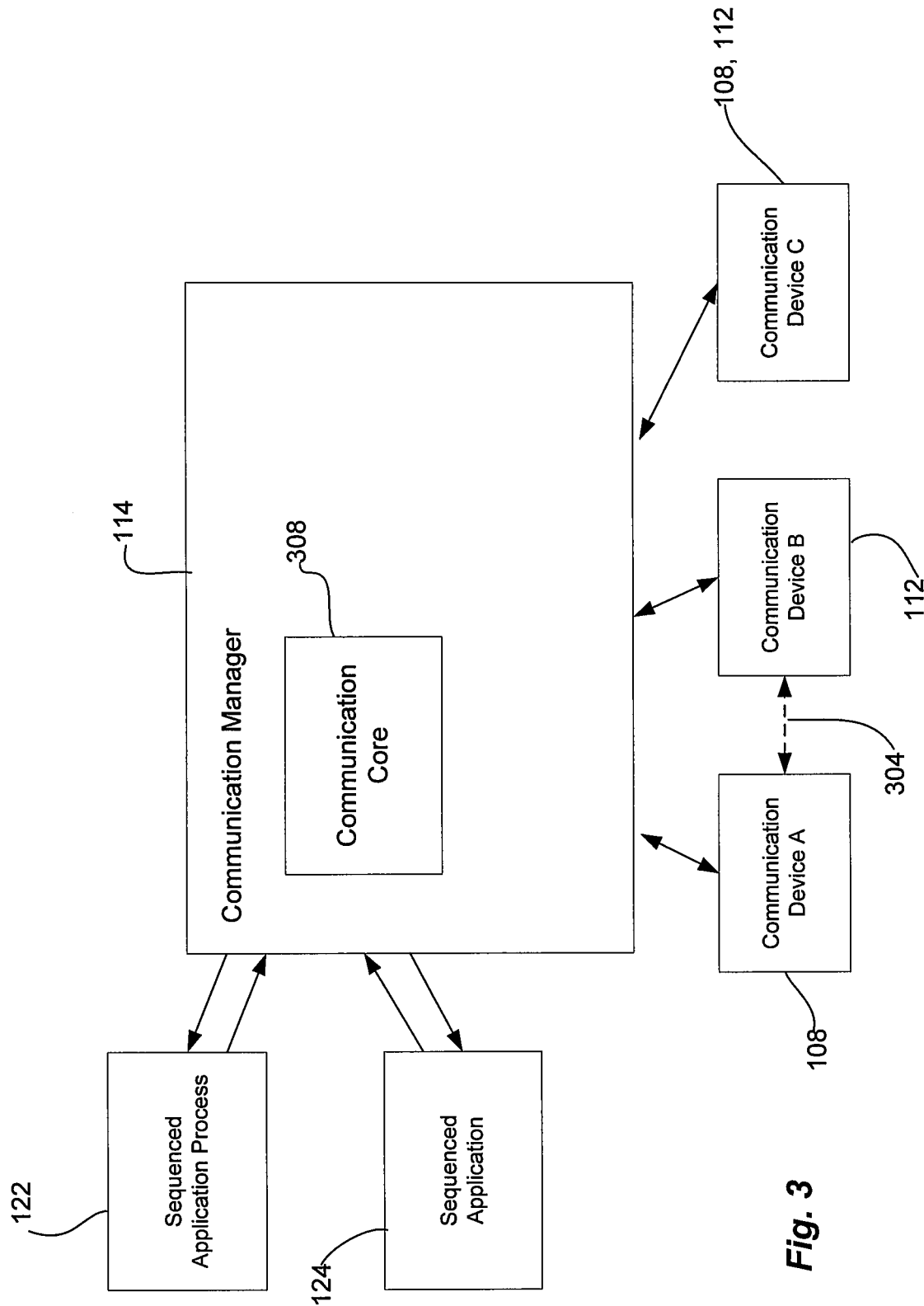
FIG. 3 depicts the relationship of components within a communications system in accordance with exemplary embodiments of the present invention.

FIG. 3 depicts the relationship of components within a communications system 100 in accordance with exemplary embodiments of the present invention. In this example, communication device A 108 has established a communications sessions 304 with communication device B 112 through a session facilitated at least in part by the communication manager 114. Running on the communication manager 114, a communication core 308 performs various functions. In accordance with embodiments of the present invention, these functions include notifying the sequenced application process 122 of the communications session 304. The sequenced application process 122 operates to determine what, if any, applications or services associated with a sequenced application or applications 124 are to be applied upon termination of the communications session 304. This determination is made by the sequenced application process 122 applying sequenced application rules 118. More particularly, embodiments of the present invention determine new, communication focused actions that will be performed at the termination of the session 304. Moreover, not every communications session 304 will have such actions performed, and such actions may vary from communications session to communications session. More particularly, the services or applications that are applied to a particular session can depend on variables associated with a communications session 304. For instance, these variables can include the identity or identities of the communicants, for example as determined by the identity of participant communication devices 108 and/or 112, based on identification information obtained through other means. Examples of other variables associated with the communications session 304 that can be expressed or included in rules 118 for determining whether to take an action include communication preferences of one or both communicants, time of day, presence information, and the like.

When the communications session 304 is terminated, the communication core 308 notifies the sequenced application process 122. In response to receiving a notification that the communications session 304 has terminated, the sequenced application process can initiate the execution of the sequenced application or applications 124 that the sequenced application process 122 has determined should be performed upon termination of the communications session 304. In accordance with embodiments of the present invention, the service or services that are applied upon termination of the communications session 304 comprise a new communications session or function. Moreover, the new communications session or function need not involve the communicants that were parties to the original communications session 304. Moreover, the modality of the new communications session need not be the same as the original communications session 304. As one example, a service or application 124 that is launched upon termination of the communications session 304 may comprise the generation of a transcript of some or all of the conversation comprising the content of a communications session 304, and the delivery of that transcript to communication device C 108 or 112, that is associated with a third party.

Figure 4:
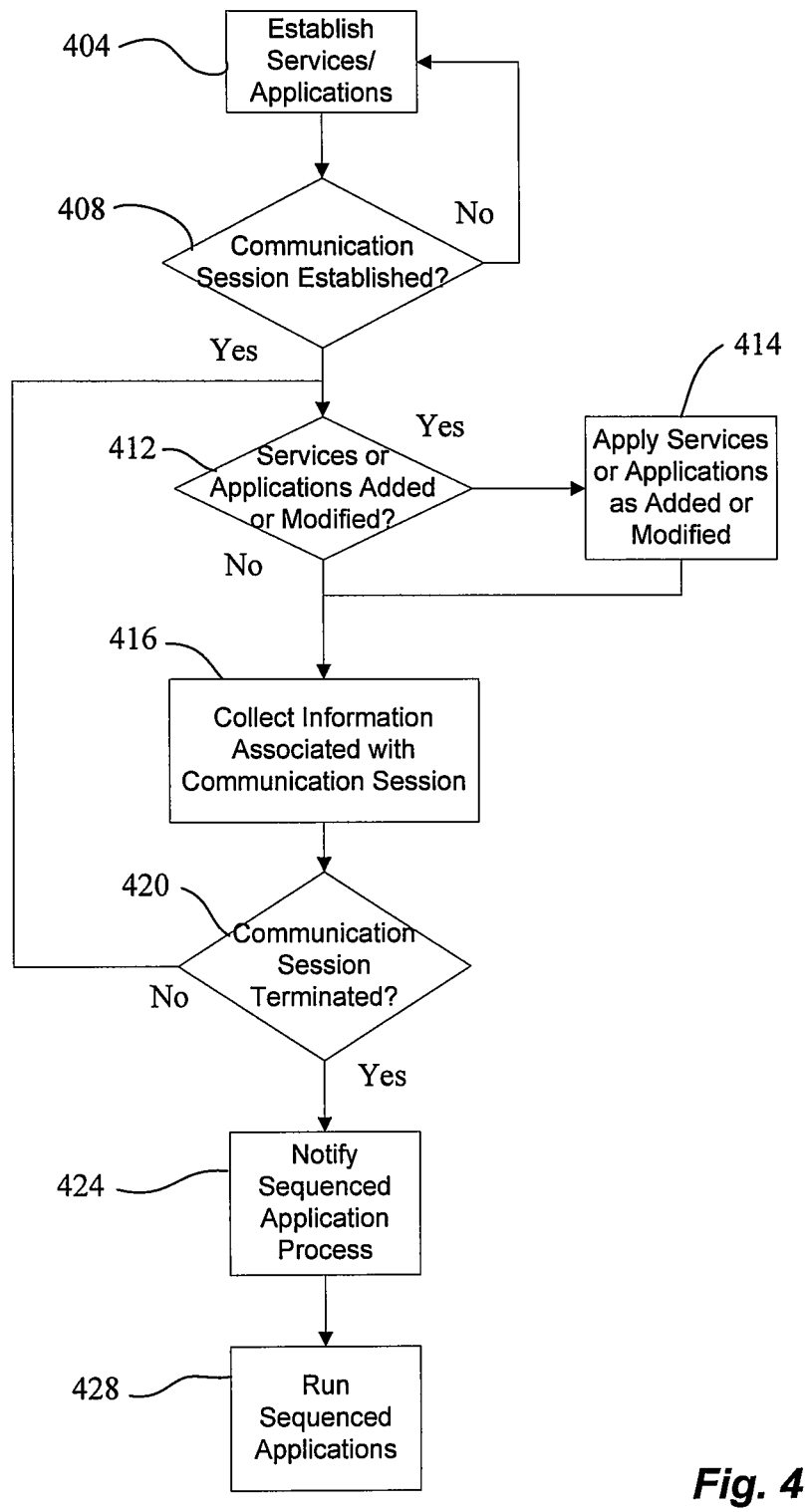
FIG. 4 is a flowchart illustrating aspects of the operation of a sequenced application process in accordance with embodiments of the present invention.

FIG. 4 is a flowchart illustrating aspects of the operation of a sequenced application process 122 in accordance with embodiments of the present invention. Initially, one or more services or applications 124 are established (step 404). Establishing the services and/or applications 124 can include, in addition to specifying such services and applications, identifying the circumstances under which they will be applied in a set of sequenced application rules 118. For example, a user or administrator can specify in rules 118 that a particular service or application or set of services or applications 124 will be applied only when particular variables associated with a communications session 304 are present. Examples of such communications session variables include the identity of a party or the parties participating in a communications session 304. Alternatively or in addition, whether the specified services or applications 124 are applied can be based, at least in part, on the modality of the communications session 304. Any other variables associated with a communications session can also be used to determine whether or not particular services or applications will be applied.

At step 408, a determination is made as to whether a communications session 304 that is associated with instructions to automatically implement services or applications 124 has been established. If such a communications session 304 has not yet been established, a process may return to step 404, and services or applications may continue to be set up for various communications session scenarios, or modified as desired by the user and/or administrator. If a communications session 304 for which services or applications 124 are to be automatically initiated upon termination of the communications session 304 is established, a determination may be made as to whether the user and/or administrator has added or modified existing services or applications that will be applied at the termination of the communications session 304 (step 412). Accordingly, it can be appreciated that the selection of applications or services that will be applied in connection with the communications session can be performed during the communications session 304, as well as prior to establishment of the communications session 304. Moreover, in accordance with embodiments of the present invention, the applications or services can be set up during the initial negotiation of the communications session 304. The selection of applications and services can be established in sequenced application rules 118. If additions or modifications have been made, the added or modified services or applications are applied (step 414).

At step 416, information about that communications session 304 may be collected. More particularly, one or more variables associated with the communications session can be identified. Variables associated with the communications session can include information identifying that particular communications session, the parties to the communications session, modality of the communications session, time and date stamp information, and the like. Alternatively or in addition, if one or more services or applications that are to be initiated upon termination of the communications session 304 require the collection of content transmitted as part of the communications session 304, such content can be recorded or otherwise collected as necessary.

At step 420, a determination is made as to whether the communications session has been terminated. If the communications session has not been terminated, the process may return to step 412, and information related to the communications session may continue to be gathered, as necessary. If the communications session has been terminated, the sequenced application process 122 is notified (step 424). The sequenced application process 122 then triggers the execution of the selected applications or services 124 (step 428). The process may then end.

As can be appreciated by one of skill in the art after consideration of the present disclosure, embodiments of the present invention provide a variety of sequenced applications 124 upon communications session 304 termination. Moreover, the sequenced applications 124 can be provided regardless of whether termination of the communications session 304 is deliberate or due to some sort of service perturbation. In addition, a sequenced application process 122 may operate to provide a sequenced application 124 to any variety or modality of communications session 304, including but not limited to voice, instant messaging, facsimile, chat, video, or the like. In accordance with embodiments of the present invention, one or more features or resources as needed, such as automatic speech recognition, call recording, or the like, and one or more recipients of the application 124 output, are set up as a portion of the initial negotiation of the communications session, during the communications session, or prior to the communications session, to drive the applications 124 launched upon call disconnect. The set up of these features, resources, and outputs can be accomplished by one of the parties to the communications session 304, by an administrative person on behalf of the participants, or other third parties, by other classes of third parties, such as a government agency, or the like. The system set up features can be implemented as sequenced application rules 118, and can invoke, schedule, or otherwise request resources and applications 124 as needed to suit the intentions of the party requesting the features.

Examples of services that can be provided by sequenced applications 124 in accordance with embodiments of the present invention include messages, transcriptions, recordings, information sharing, billing, verification, participant listing, reporting, date and time stamping, linkages to other applications, launching of software programs, initiation of one or more subsequent communications sessions via the same and/or other communications modalities, and the like. Examples of resources that can be applied by sequenced applications 124 include, but are not limited to, call recording, form fillers, transcoding, automatic speech recognition, formatting for other communication modalities, and the like. Moreover, the number and variety of services and resources that can be provided by sequenced applications 124 triggered by a sequenced application process 122 and applying sequenced application rules 118 in accordance with embodiments of the present invention exceed the capabilities that could be accomplished manually by a communications session participant.

One illustrative embodiment is when a telephone call recording is desired. Upon disconnect, the recording of the call could be run through Automatic Speech Recognition (ASR), or alternatively may have been administered to be processed in real time during the conversation. The text transcript of the discussion could then be sent via email to one or more parties which may or may not include the participants. To continue this illustration, the identities of the parties on the call, the date and time stamps for the call and other such information could be selectably provided as a part of, or in association with, the text transcript. In a variation of this embodiment, the text from such a call could be emailed to a storage repository or other archive with call specifies, key word matches, event tags, and other such events/facts relating to the session. Tags from the text version of the call could also be generated and sent to one or more participants, to a supervisor in a Contact Center environment or the like.

A second illustrative embodiment is when call accounting information is desired. Personal and/or business call duration, dates, times and the like can be maintained by triggering an application upon call disconnect. The application could compile call related facts such as the participants, date, start/stop/elapsed time, call billing information and the like and either provide those facts to an accounting associate, automatically populate a form or the like. Information about the call could be used for billing purposes for professionals that need to account for their time such as lawyers, accountants, and doctors, or the like. Other non-session information such as an account codes, resource expenses, or the like could be automatically added to the form, or forwarded to staff to process, based on, or in association with, the session information.

Another illustrative embodiment is the trigger of a voice message to the calling party upon call disconnect. For example, lets say a customer is calling their stock broker to initiate a transaction, the broker is not available and the customer decides to leave a voice message. Such a case could lead to forwarding a subsequent message such as "While voice messages are important to us, and are typically served as soon as is possible, that no action based on this voice message is guaranteed to occur in a specific time period". In a related embodiment any warnings or other messages required by regulatory agencies could similarly be provided. These announcements could use the same communication modality or could be sent as a follow-up message using any communication modality after the call.

Yet another embodiment would be triggered if a user goes over time on a telephone call or the like. Upon termination of the communication session, the application can immediately inform you with what your next appointment is based on your calendar. While this feature can be provided by a MS Outlook, or equivent, via a pop-up window on one's computer, when one is involved on an IP softphone call on the same computer, the application proposed here would be able to push the calendar information to any device, pc, phone or the like in a form specific to, and advantageous for, the current device, pc, phone or the like. For example, if a user has two sequential phone calls, with or without time in between them, the application could forward a whisper announcement triggered by the ending of the first call, or alternatively the predicted end time of the first call, to let them know that the next call is about to begin, has begun, has been cancelled or the like. It could go on to provide them with several options with regard to continuing the first call, beginning the second call, rescheduling one or the other, or the like. To continue with this example, it could be that the first call can be completed via a short IM session allowing the user to join the second call on time. Another variation would be to have the application signal that you will be joining the second call, but need a moment to complete the first call.

Another useful embodiment would be if a call or message arrived prior to one concluding a current communication session. Upon termination of the communication session, the user could be prompted to return the call, or retrieve the message, automatically or move on to other work and defer the call back, or message retrieval, based on user input or from the next available unoccupied time on one's calendar.

A more complex embodiment would be the case where information from a communication session would be useful to other parties. The other parties could be distributed on a variety of devices, in different environments, with a variety of interests, and/or with diverse device feature sets. Further those other parties might need different amounts of information from the communication session or need them routed to their current device based on presence to be effective. As a result, multiple application outputs could be created based on Rich Presence, word spotting or other information about the other interested parties. So for example, David and Larry could be involved in a phone call about sequenced applications after having discussed in an email thread. Greg may need just a summary of the call information, but is mobile in an environment like a trade show where there is a lot of noise. Greg would receive a distillation of the text transcript appropriate to his device and environment. Another interested party, say for example someone in the patent department, could desire the entire discussion as a voice recording provided as an email attachment and including the email thread that led up to the voice conversation. The full discussion could be forwarded to this person as an audio recording attachment on the related email thread to provide context. Still another party that is an executive in David and Larry's organization might desire just an IM to the effect that "work on sequenced applications is proceeding". In such a way, a variety of resources, formats, users, and the like can be processed based on a single event trigger such as call completion.

In another example, rules 118 may be established that result in the execution of a sequenced application 124 following termination of a communications session 304 with respect to one participant in a conference call, even though communications between other participants of the conference call may continue. For example, if one participant in a conference call needs to drop off, in response to termination of the communications session 304 with respect to that participant, a sequenced application that records and/or transcribes the remainder of the call can be executed.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for initiating a process, comprising:
   establishing a first communication session between a first party associated with a communication device and a second party associated with a second communication device;
   during the first communication session, identifying one or more variables associated with the first communication session, and comparing the one or more variables associated with the first communication session to one or more rules to determine a first process to initiate, wherein the one or more rules specifies the one or more variables that are to be present in order to initiate the first process;
   detecting a termination of the first communication session, and
   in response to detecting the termination of the first communication session, initiating the first process; wherein the first communication session further includes a third communication device, wherein the termination of the first communication session is with respect to the first communication device such that the first process initiated in response to detecting the termination of the first communication session collects information including content from at least a portion of the communication session between the second communication device and the third communication device, and wherein the first process provides a first output to the first party containing at least a portion of the collected information.

2. The method of claim 1, wherein identifying one or more variables associated with the first communication session includes identifying at least the first party to the first communication session.

3. The method of claim 1, further comprising:
   identifying the second party to the first communication session;
   wherein the first process to initiate subsequent to the termination of the first communication session is determined in response to identifying the first and second parties to the first communication session.

4. The method of claim 1, wherein the first process is the initiation of a second communication session.

5. The method of claim 1, wherein the second communication session includes the first party and a third party.

6. The method of claim 1, further comprising:
   in response to identifying one of the one or more variables associated with the first communication session or a second variable associated with the first communication session, determining a second process to initiate in response to the termination of the first communication session.

7. The method of claim 1, wherein the first process provides a first output to the first party and a second output to the second party, the second output being different from the first output, and wherein the second process provides an output to at least one of the first party and the second party.

8. The method of claim 1, wherein the first communication device is interconnected to the second communication device by at least a first communication network, wherein the first communication session is supported by a first communication core, and wherein the one or more processes are at least partially executed by a first application server.

9. The method of claim 1, wherein the first communication session comprises a first communication modality, and wherein the second communication session comprises a second communication modality.

10. The method of claim 1, wherein in response to detecting the termination of the first communication session a plurality of processes are initiated, wherein the first process is included in the plurality of processes.

11. The method of claim 1, wherein the first process is determined based on a modality of the first communication session.

12. The method of claim 1, wherein at least one of the first output and second output are based on one or more of presence information, keyword matching, and information about one or more interested parties.

* * * * *